Feb. 5, 1963 R. J. GARVEY ETAL 3,076,606
APPARATUS FOR CONTROLLING HEATING SYSTEMS
Original Filed April 26, 1957 3 Sheets-Sheet 1

INVENTORS
Richard J. Garvey
John J. Richards
BY
ATTORNEY

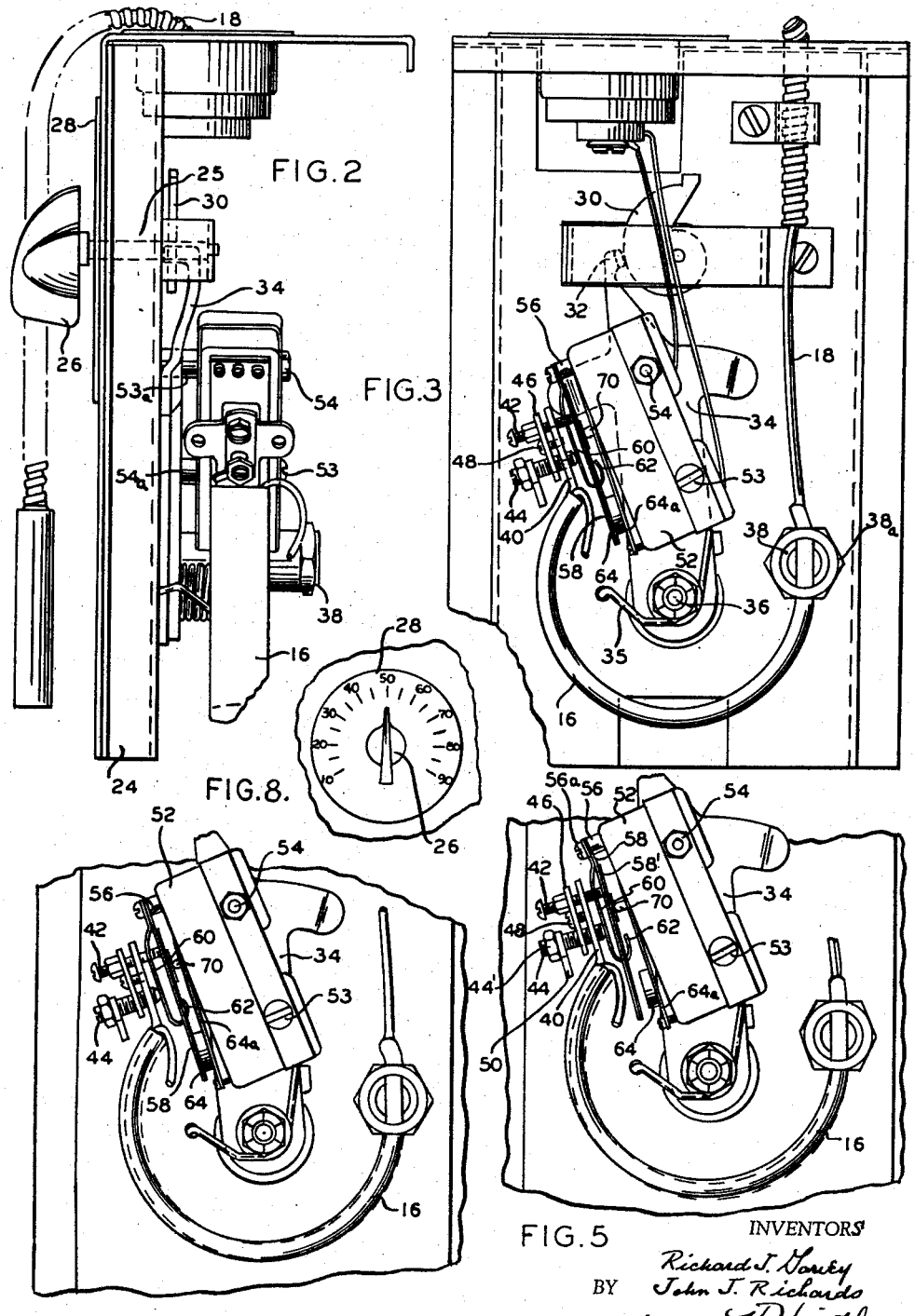

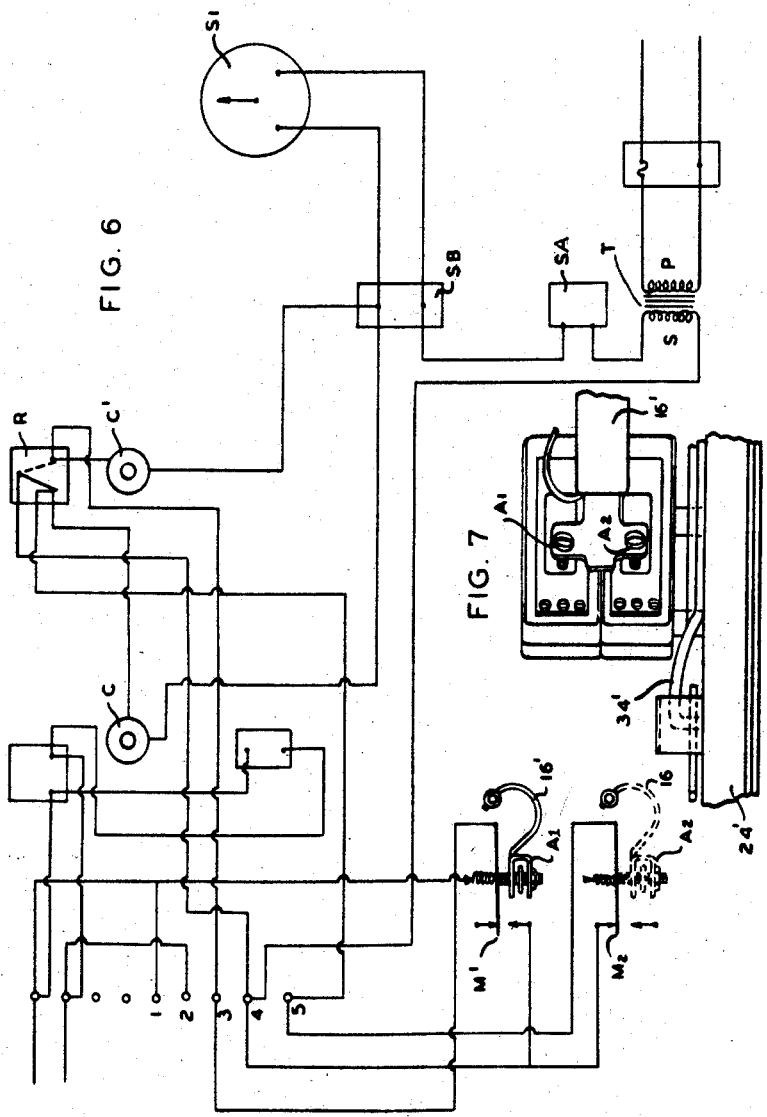

United States Patent Office 3,076,606
Patented Feb. 5, 1963

3,076,606
APPARATUS FOR CONTROLLING
HEATING SYSTEMS
Richard J. Garvey, Dorchester, and John J. Richards,
Brookline, Mass.; said Richards assignor to said Garvey
Original application Apr. 26, 1957, Ser. No. 655,216, now
Patent No. 2,988,281, dated June 13, 1961. Divided
and this application Mar. 31, 1961, Ser. No. 110,599
2 Claims. (Cl. 236—38)

This invention relates to an electrical control apparatus for heating systems, reference being had particularly to heating systems of the class employed in larger type buildings such as apartment and office buildings, industrial plants, institutions, homes, etc.

The present application is a division of application Serial No. 655,216, filed April 26, 1957, now Patent No. 2,988,281, granted June 13, 1961..

In Patent No. 2,319,315, issued May 18, 1943, there has been disclosed an earlier form of electrical control apparatus wherein is provided a Bourdon type thermostat having a bulb extension adapted to be located in the outdoor atmosphere. The Bourdon tube itself is located in close proximity to a heating element of a heating system so that the Bourdon, in effect, responds to both indoor and outdoor conditions and acts as an integrating thermostat to provide a so-called "weather control."

The present invention, in one preferred form, seeks to employ a similar Bourdon tube arrangement and, in addition, to combine with the Bourdon tube a special electromechanical switch arrangement by means of which the heating system may be caused to operate for a short period during an early morning hour, for example, to provide a temperature which exceeds the normal day temperature so that a relatively quick warm-up period may be realized at the start of the day. This warm-up period is frequently referred to as "morning pick-up." Once the desired morning pickup has been accomplished, the system is required to automatically go back into intermittent normal temperature operation for the rest of the day or for some other operating period.

It is a further object of the invention to devise a control by means of which there may not only be realized morning pick-up but also the time interval during which the morning pick-up will operate will be constantly modified by the temperature of the outdoor atmosphere.

Still another object is to provide means for controlling the heating system to provide morning pick-up either by means of two independent electrical switches or by a single electromechanical switch, and, in the case of the electromechanical switch, devise to provide a greatly simplified unit which may be easily and cheaply installed in a wide range of heating systems presently employed.

These and other objects and novel features will be more clearly understood and appreciated from the following description of a preferred embodiment of the invention selected for purposes of illustration and shown in the accompanying drawings, in which FIG. 1 is a diagrammatic view showing a typical heating system and particularly illustrating the electrical control unit of the invention contained in a protective housing which is mounted at one point on a heating element of the heating system;

FIG. 2 is a detail elevational view of the electrical control apparatus shown in FIG. 1 with a portion of the housing having been removed to indicate certain components of the apparatus;

FIG 3 is a plan view more clearly showing the apparatus with a Bourdon tube element in a position of adjustment with respect to certain switch components;

FIG. 4 is a view somewhat similar to FIG. 3 but showing the Bourdon tube in another position of adjustment resulting from its having been expanded slightly;

FIG. 5 is a view similar to FIGS. 3 and 4 illustrating the Bourdon tube in still another expanded position of adjustment; and FIG. 6 is a schematic wiring diagram showing another form of control and special switch apparatus of the invention;

FIG. 7 is a detail elevational view of a part of the switch means of FIG. 6; and FIG. 8 is a detail view of a scale member.

Figure 1:
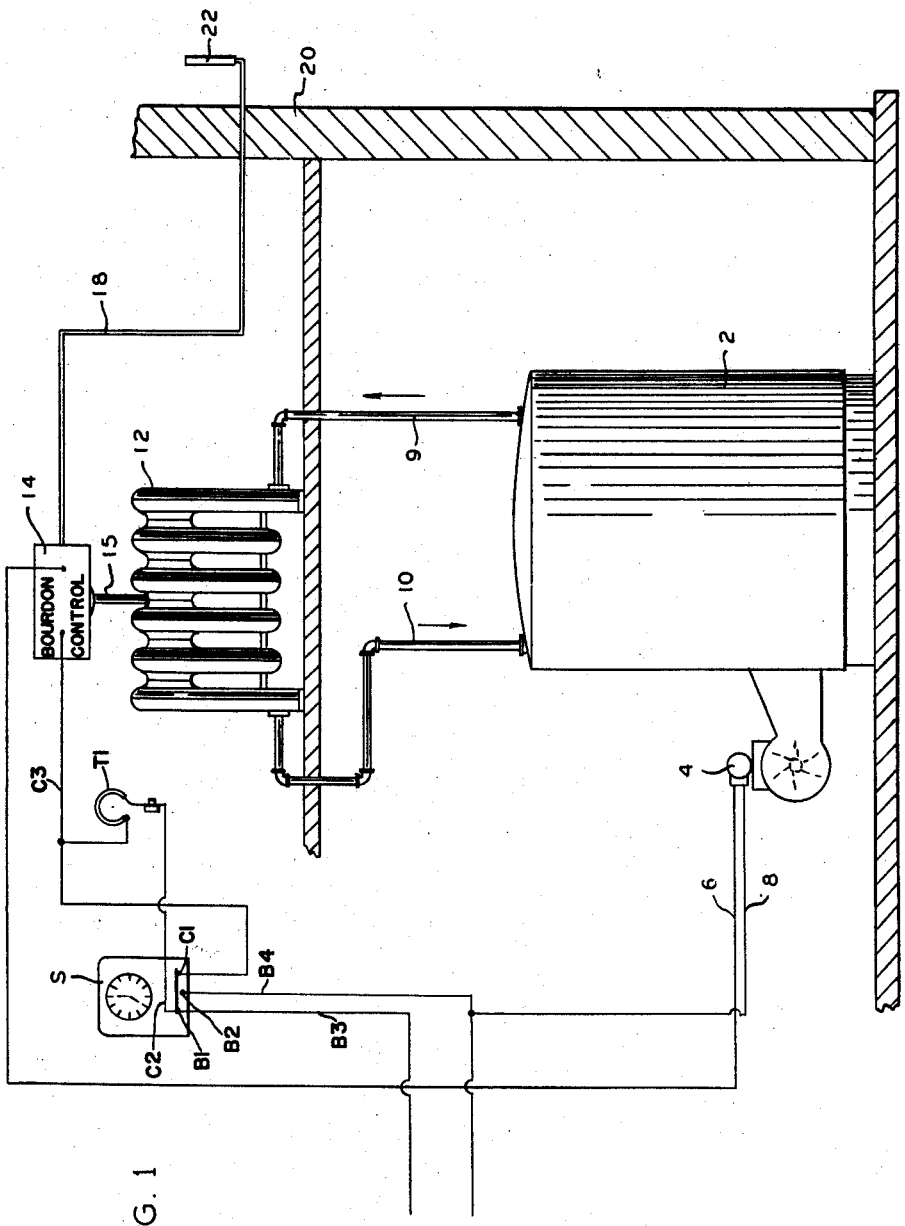

The combination of parts of the present invention, by means of which we have discovered these objectives may be realized practically, is based on the initial concept of utilizing a differential expansion and contraction of an integrating Bourdon tube type thermostat to carry out a predetermined sequence of operation of a heating system so that heating for different time intervals may be accomplished. In addition, during each of these time intervals, the temperature of outdoor atmosphere is constantly utilized to exercise a modifying action.

As an important component of the combination, there has been devised an electromechanical control switch assembly which is contained as a single contact unit in a protective housing together with the integrating Bourdon tube. This entire unit is connected into the circuit of an electrically controlled heating source, together with a suitable time switch element. The electrically controlled heating source may include a conventional low limit thermostat of the class commonly employed for this purpose.

It should be understood that the invention as hereinafter discussed with specific reference to the particular heating system indicated in the drawings is not intended to be limited thereto and may be practiced in connection with varying heat sources including oil burners, stokers, gas heating burners, electrical heating units, valve control heat sources and the like.

Attention is directed to FIG. 1 in which we have shown one typical heating system illustrative of an electrically controlled source of heat. Numeral 2 denotes a boiler having a burner unit 4 electrically controlled through conductors 6 and 8. Heating conduits as 9 and 10 provide for conducting heat to a space to be heated by means of a heating element such as a radiator 12.

For purposes of illustration, it may be assumed that the heating system is an oil fired steam heating system and that the space to be heated is under the control of a conventional low limit thermostat and consists of a remote section of a building such as an apartment house. It may also be assumed that, from prior experience with a conventional heating control apparatus, the janitor of the apartment house has found that a desirable operation requires a temperature of 70° F. to be maintained by the low limit thermostat at the remote section noted during a period of from six o'clock in the morning until eleven o'clock at night. At eleven o'clock it is desired to let the temperature drop to 50° F. at the particular section referred to and the temperature is to remain at this lower value during the night hours. At six o'clock the following morning, it is desired to run the heating system for a period long enough to raise the temperature at the remote section to a value well above 70° F., say, 74° F. to provide a morning pick-up. When this temperature is provided, the system is required to go back to operating under the control of the conventional low limit thermostat on a normal daily 70° F. temperature value. It is the function of the present invention to accomplish this sequence operation and, in addition, to modify the operation of the heating system at each one of these heating intervals in a manner regulated by changes in outdoor atmosphere.

Accordingly, we provide an electrical control apparatus which is contained in a housing 14 supported on a bracket 15 in closely spaced relation to the heating element 12. In this housing 14 a Bourdon tube 16, better shown in FIGS. 2–5, inclusive. The Bourdon tube is provided with a length of tubing 18 extending through a sidewall 20 to support a bulb 22 at a point in the outdoor atmosphere. Connected into the electrical circuit for the burner 4 is a time switch S which is in series with an electrical conductor leading into the housing 14, as shown in FIG. 1. The electrical circuit for the burner 4 also includes the conventional low limit thermostat T1 which is shunted across the terminals of the time switch S in a manner commonly employed to provide for intermittent burner operation during the periods occurring between operation of the time switch.

A typical form of time switch which may be employed for the time switch S, shown in FIGURE 1, is the Intermatic Time Switch manufactured and sold by the International Register Company of Chicago, Illinois. This switch includes a terminal B1 and a terminal B2. Current from a source is supplied through a conductor B3 and energizes a conventional clock motor within the housing of the switch S. Conductor B4 completes a path for current to return from the motor through terminal B2 to ground. A third terminal in the Intermatic switch, indicated by C1, is closed by a switch element C2. The low limit switch T1 has one side connected to the terminal B1 and the other side connected into the electrical conductor C3, running to the Bourdon control switch as shown in FIGURE 1.

The Bourdon tube 16 and its housing 14 is designed to be supported in close proximity to the heating element 12, but not in contact with it, so as to furnish a desirable time interval which first provides time for steam to flow through the system and to heat up all the heating elements in the system before the Bourdon tube operates to shut off the burner. Secondly, this time interval provides an opportunity for the modifying action of the outside bulb 22 to come into effect. Thirdly, the spacing of the Bourdon tube and its housing from the heating element 12 permits the Bourdon tube to be further responsive in some degree to the ambient temperature of air circulating in the immediate vicinity of the heating element.

Thus, it will be appreciated that the Bourdon tube integrates each of the temperature variants noted to provide a constantly changing displacement of the free end of this Bourdon tube and such displacement of the free end is, in accordance with the invention, employed to carry out a predetermined sequence operation of the heating system as detailed below.

The housing 14 in which the control apparatus is contained may, for example, be made in two sections which are detachable from one another and one of these sections, namely, a bottom section 24, is illustrated in FIG. 2 with an upper section having been removed to more clearly indicate the Bourdon tube and switch components. As shown therein, the bottom section 24 of the housing has a shaft 25 rotatably mounted through its central portion and on the outer end of the shaft is fixed an indicator 26. Arranged to lie in register with the indicator 26 on the outer surface of the housing is a circular scale 28 having a series of divisions thereon.

At the opposite end of the shaft 25 is fixed a cam element 30 which is formed with a cam surface adapted to engage against a tip 32 of a switch support arm 34. Arm 34 is pivotally mounted in the bottom section of the housing on a post 36 and is resiliently held by a spring 35 anchored in the bottom section.

In spaced relation to the post 36 is a threaded member 38 which is formed with a slot in which is received one end of the Bourdon tube 16, as shown in FIGS. 3, 4 and 5. A locking nut 38a tightly holds the end of the Bourdon. The opposite end of the Bourdon tube 16 is constructed with a switch actuating assembly which includes an extension piece 40. Threaded into this extension piece in suitably threaded openings are two actuating screws 42 and 44.

A clamping plate 46 is adjustably secured by means of an adjustment screw 48 to tightly hold the two actuating screws in any desired position of adjustment in the extension 40. One position is shown with one of the screw extremities projecting beyond the other. The screw 44 may also be formed with a stop nut 50 which, when locked by the nut 44', permits the screw 44 to be turned through only a limited arc of rotation. This tends to maintain the screw within a desired range of setting.

It will be apparent that, by means of the two different projecting lengths of the actuating screws, contraction and expansion of the Bourdon tube can achieve two different displacement effects and, to take advantage of this, we have devised a spring arm and retractor device which is combined with a snap action precision switch as shown in FIGS. 2–5, inclusive.

Numeral 52 indicates the snap action precision switch. This member is detachably secured on the switch support arm in some convenient manner as, for example, by means of two holding screws 53 and 54 which extend through body portions of the switch 52 and through the spacing posts 53a and 54a and are engaged in the switch arm 34. If desired, the arm 34 may be formed with a slightly elongated slot through which the holding screw 54 is received. By loosening the holding nut 54, that end of the switch through which this screw extends may be swung towards or away from the free end of the Bourdon tube a short distance to provide for adjustment of the spacing between the Bourdon tube and switch 52.

Along one side of the switch 52 is solidly secured a block 56 on which is fastened by screws 56a a spring element 58 which is formed with a set or bent portion. On one side of this spring element 58 is an armature strip 58'. A magnet 64 secured at the opposite end of the switch 52 on a strip 64a is adapted to hold the spring armature 58 firmly against itself in one position of adjustment of the spring element 58.

Also secured on the block 56 is a spring retractor 60 which is offset at one point so that it lies in spaced relation to the spring armature 58. The end of this spring armature 58' is formed with a hook 62 which extends through an opening in the spring 58 and armature 58' and overlies one edge of the opening so that in one position the hook extremity may engage against the spring armature 58' and pull it away from the magnet 64. The spring retractor 60 also has formed therethrough an opening through which extends the extremity of the actuating screw 42 in a position to bear against the armature and, in response to contraction of the Bourdon tube, to force the armature against the magnet 64. It should be noted that the actuating screw 42 contacts the spring armature 58 at a point nearer the supporting block 56 than does a switch operating plunger 70 which causes an increased ratio of movement of the plunger 70 over that of the actuating screw 42. This is desirable as it allows greater spacing of the switch contacts giving greater reliability without lessening the sensitivity of the switch.

It will be observed that the spring armature 58 is also arranged to engage against and depress the operating plunger pin 70 which, in a depressed position, closes the switch 52. In the normal daytime operation of this arrangement, the Bourdon tube contracts and expands within a limited range of travel and through the actuator 42 causes the spring armature 58 to open and close switch 52 without the armature moving into contact with the magnet 64.

At some desired time, as 11:00 p.m., the time switch S operates and current supply to the switch 52 is interrupted. The temperature falls until the low limit thermostat contracts and closes a circuit which is shunted through the time switch terminals to the switch 52.

However, during low temperature operation the temperature of the Bourdon is caused to drop and the Bourdon tube will contract to a point where screw 42 forces the armature against the magnet and the switch 52 becomes held in a closed position. As this occurs, the actuator screw 44 forces the retractor hook 62 inwardly through the spring armature a short distance further so that the hook is spaced away from the spring armature 58. It will be seen that the Bourdon tube, having reached a state of contraction resulting from running the heating system at a night temperature of, say, 60° under the control of the low limit thermostat will not expand sufficiently to cause the hook to disengage the spring armature from the magnet until such time as a higher temperature of 70° is required. This will not occur until morning pick-up is required.

At this time, say six o'clock in the morning, the time switch S operates and completes a circuit to the Bourdon switch and a 70° temperature is called for. The Bourdon tube expands through a limited distance, such as would ordinarily open the plunger control switch. However, since the spring armature 58 is held by the magnet and is not contacted by the hook, the heating system continues to run and a greater expansion of the Bourdon tube takes place until finally the hook does engage against the spring armature and pulls it away from the magnet.

In the interval thus occurring for the hook to disengage the armature, the heating system has operated long enough to provide a morning pick-up, that is to say, long enough to raise the temperature at the remote section of the apartment earlier referred to a temperature of, say, 74° F. Once the hook has disengaged the armature from the magnet, the Bourdon tube will thereafter operate the heat source in its normal limited range of contraction and expansion until such time as the time switch S1 again functions.

It is pointed out that, during the period of running the heating system for morning pick-up, the temperature of outdoor atmosphere is constantly in effect, both at the start as well as during the entire period that the morning pick-up operation is progressing. In this way, the demand necessitated by either a very cold morning or a very warm morning is directly taken into account while still maintaining the Bourdon tube in condition to re-establish itself at a normal daily operating temperature once the morning pick-up has been accomplished.

Installation and adjustment of the unit described is very rapidly carried out and requires a minimum of equipment and labor. In many cases, there is eliminated more complex control devices now employed for morning pick-up purposes. Once the unit has been connected into the electrical control circuit for the heating system, the system is allowed to operate until a suitable temperature is realized at some selected point. The switch and Bourdon tube are then adjusted with respect to one another by manipulating the indicator 26. Thereafter, a position may be noted on the scale at which a desired temperature is accomplished. The actuating screws on the Bourdon tube are adjusted relative to one another to provide for maintaining daily temperature operation at the value established and, at the same time, providing for desired increase in heating interval under the control of the time switch for providing morning pick-up. There are thus obtained two readings on the scale, either of which may be varied as requirements dictate.

In some types of installations, it may be desired to utilize an all-electrical control involving two independent snap action switches. For this purpose, there has been devised the arrangement shown diagrammatically in the schematic wiring diagram of FIG. 6. In this arrangement, a housing 24' supports a Bourdon tube 16', there being utilized a mounting similar to that already described, including a pivoted arm 34'. The two snap action switches are denoted by reference characters M1 and M2 and are mounted one above the other on the arm 34'. These switches are also connected into the control circuit shown in FIG. 6. The Bourdon tube 16' is furnished with a pair of actuating units A1 and A2.

As the Bourdon expands and contracts, daily operation as well as morning pick-up is accomplished electrically in the following manner. At a predetermined time, a time switch S' closes a circuit which runs from the secondary of a transformer T to control switches SA and SB, then through the time switch S1, then to a coil C to a switch terminal R to terminal strip point 4 back to the other side of the transformer. A circuit is also made across strip terminals 4 and 5 in which circuit is the switch M2.

As such time as the heating system has provided temperature rise to meet morning pick-up requirements, the Bourdon tube will expand and close switch M1 energizing relay coil C1 and operating the switch R. This operation of switch R disconnects coil C opening switch M2 which stops operation of the heating system and simultaneously connects coil C1 to termial strip binding screw 4 thus establishing a holding circuit through coil C1 and also opens the pick-up circuit through relay switch R until time switch S1 opens or the relay coil C1 is disconnected by any other cause.

Thus, it will be seen that these has been disclosed a desirable control apparatus for sequence operation of a heating system wherein an outdoor atmosphere temperature is constantly exercising a desired modifying action. Either the single switch arrangement or the double switch may be employed with various minor changes being utilized where desired. It will be understood that, in referring to the term morning pick-up, no limiting of the invention is intended as this is illustrative of any desired special time interval operation.

While we have shown preferred embodiments of the invention, therefore, changes and modifications as defined by the scope of the appended claims may be made.

Having thus described our invention, what we claim is:

1. In a heating system of the class having a low limit thermostat located in a space to be heated, the combination with a heat source and a series of heating elements communicating with space to be heated, of means for controlling the delivery of heat to said heating elements including an electrical circuit and a thermostat for operating said heat source, said thermostat consisting of a Bourdon tube containing a body of temperature responsive fluid located at the head of the instrument and a bulb containing a second body of said fluid located remote from the first body but connected therewith by capillary tubing, said bulb being located in such a position that it responds promptly to changes in temperature of the outdoor atmosphere, means comprising a housing in which one end of the Bourdon tube is secured, said housing being mounted closely adjacent to, but spaced from, one of said heating elements whereby the Bourdon tube responds to temperature changes in the ambient atmosphere immediately surrounding the housing, said electrical circuit including a normally closed time switch having said low limit thermostat shunted across the terminals thereof, and electromechanical switch apparatus adapted to supply current to the heating source when either the time switch or the low limit thermostat switch is closed, said electromechanical switch apparatus including a switch support adjustably secured in the housing, means fixed on such switch support and responsive to movement of the free end of the Bourdon tube for operating the heat source at predetermined intermittent intervals in order to maintain a desired normal temperature at the space to be heated, and dual switch means mounted in the housing adjacent to the Bourdon tube and operative when the time switch is opened and also responsive to movement of the free end of the Bourdon tube for periodically operating the heat source for an interval of time sufficient to raise the temperature of the space to be heated to a value exceeding in predetermined degree the said desired normal temperature.

2. In a heating system of the class having a low limit thermostat located in a space to be heated, the combination with a heat source and a series of heating elements communicating with space to be heated, of means for controlling the delivery of heat to said heating elements including an electrical circuit and a thermostat for operating said heat source, said thermostat consisting of a Bourdon tube containing a body of temperature responsive fluid located at the head of the instrument and a bulb containing a second body of said fluid located remote from the first body but connected therewith by capillary tubing, said bulb being located in such a position that it responds promptly to changes in temperature of the outdoor atmosphere, means comprising a housing in which one end of the Bourdon tube is secured, said housing being mounted closely adjacent to, but spaced from, one of said heating elements whereby the Bourdon tube responds to temperature changes in the ambient atmosphere immediately surrounding the housing, said electrical circuit including a normally closed time switch having said low limit thermostat shunted across the terminals thereof, and electromechanical switch apparatus adapted to supply current to the heating source when either the time switch or the low limit thermostat switch is closed, said electromechanical switch apparatus including a switch support adjustably secured in the housing, means fixed on such switch support and responsive to movement of the free end of the Bourdon tube for operating the heat source at predetermined intermittent intervals in order to maintain a desired normal temperature at the space to be heated, and dual switch means mounted in the housing and operative when the time switch is opened and also responsive to movement of the free end of the Bourdon tube for periodically operating the heat source for an interval of time sufficient to raise the temperature of the space to be heated to a value exceeding in predetermined degree the said desired normal temperature, and said dual switch means consisting of two switch elements mounted at either side of the free end of the Bourdon tube in a position to be alternatively actuated thereby.

References Cited in the file of this patent
UNITED STATES PATENTS

| | | |
|---|---|---|
| 2,268,711 | Lewandowski | Jan. 6, 1942 |
| 2,319,315 | Garvey | May 18, 1943 |
| 2,604,267 | Smith | July 22, 1952 |
| 2,719,672 | Jenkins | Oct. 4, 1955 |